US011442914B1

United States Patent
Kulikov

(10) Patent No.: US 11,442,914 B1
(45) Date of Patent: Sep. 13, 2022

(54) EFFICIENT LSH COMPUTATION

(71) Applicant: Pinterest, Inc., San Francisco, CA (US)

(72) Inventor: Vitaliy Kulikov, San Francisco, CA (US)

(73) Assignee: Pinterest, Inc., San Francisco, CA (US)

( * ) Notice: Subject to any disclaimer, the term of this patent is extended or adjusted under 35 U.S.C. 154(b) by 215 days.

(21) Appl. No.: 16/417,479

(22) Filed: May 20, 2019

(51) Int. Cl.
 *G06F 16/22* (2019.01)
 *G06F 16/27* (2019.01)

(52) U.S. Cl.
 CPC ........ *G06F 16/2255* (2019.01); *G06F 16/278* (2019.01)

(58) Field of Classification Search
 None
 See application file for complete search history.

(56) References Cited

U.S. PATENT DOCUMENTS

| | | | |
|---|---|---|---|
| 2007/0217676 A1 | 9/2007 | Grauman et al. | |
| 2013/0279806 A1 | 10/2013 | Tonisson et al. | |
| 2014/0211039 A1 | 7/2014 | Herman et al. | |
| 2015/0019640 A1 | 1/2015 | Li et al. | |
| 2015/0049943 A1 | 2/2015 | Hamsici | |
| 2017/0046382 A1* | 2/2017 | Li | G06F 16/2264 |
| 2019/0138290 A1* | 5/2019 | Garvey | G06F 8/65 |
| 2019/0197133 A1 | 6/2019 | Biswas | |

OTHER PUBLICATIONS

Terasawa et al., "Spherical LSH for Approximate Nearest Neighbor Search on Unit Hypersphere", 2007 (Year: 2007).*
Wang et al., "Hashing for Similarity Search: A Survey"; 2014 (Year: 2014).*
Andoni, A., Indyk, P., Laarhoven, T., Razenshteyn, I., and Schmidt, L., "Practical and Optimal LSH for Angular Distance," Sep. 10, 2015, https://arxiv.org/pdf/1509.02897.pdf, 21 pages.
Jégou, H., Matthijs, D., and Schmid, C., "Product Quantization for Nearest Neighbor Search," IEEE Transactions on Software Engineering, Jan. 2011, 15 pages.

* cited by examiner

*Primary Examiner* — Dawaune A Conyers
(74) *Attorney, Agent, or Firm* — Athorus, PLLC

(57) ABSTRACT

Systems and methods are presented for efficient and effective computation of LSH hashing functions for use in various environments, including nearest-neighbor search. A corpus of items is maintained, with each item of the corpus being associated with information identifying one of a plurality of LSH partitions to which the item has been mapped or hashed. In response to an input item, the input item is projected one or more times into an orthoplex inscribed within a multi-dimensional space. For each mapping, a determination is made as to the nearest vertex of the orthoplex to the projected input item, and the LSH partitions associated with the nearest vertex are aggregated and associated with the input item as the input item's LSH partition.

18 Claims, 8 Drawing Sheets

EFFICIENT LSH COMPUTATION

BACKGROUND

Locality-sensitive hashing or "LSH" is a technique frequently used in nearest-neighbor searching within a high-dimensional space. For example, LSH techniques may be used in a nearest-neighbor search to identify the closest image for an input image from a large corpus of images. Locality-sensitive hashing is often thought of as reducing the dimensionality of high-dimensional data while preserving pairwise distances between individual data points. In particular, LSH aggregates similar items into partitions or "buckets" with a high degree of probability that items mapped to the same buckets are those items that are most likely similar to each other, thereby reducing the number of candidates that need to be compared for identifying a nearest neighbor (i.e., most similar item).

An important aspect of using LSH is that the hash functions should be efficient to compute. Clearly, if computing the hash values for the items takes longer than simple comparisons between the items, there is no advantage to hashing the data. Ideally, the computation results in significant processing bandwidth. Another important aspect of LSH techniques is that the mapping of items to buckets should result in the balanced (or near-balanced) distribution of items to the various LSH buckets. Clearly, when all items are mapped to the same bucket, then the hashing has been entirely ineffective.

BRIEF DESCRIPTION OF THE DRAWINGS

The foregoing aspects and many of the attendant advantages of the disclosed subject matter will become more readily appreciated as they are better understood by reference to the following description when taken in conjunction with the following drawings, wherein.

DETAILED DESCRIPTION

For purposes of clarity and by way of definition, the term "exemplary," as used in this document, should be interpreted as serving as an illustration or example of something, and it should not be interpreted as an ideal or leading illustration of that thing. Stylistically, when a word or term is followed by "(s)", the meaning should be interpreted as indicating the singular or the plural form of the word or term, depending on whether there is one instance of the term/item or whether there is one or multiple instances of the term/item. For example, the term "user(s)" should be interpreted as one or more users. Moreover, the use of the combination "and/or" regarding multiple items should be viewed as meaning either or both items.

By way of further definition, an "embedding" or "embedding value" corresponds to, or is descriptive of, some particular aspect of an item of content. Typically, though not exclusively, embedding information (a set of embedding values of an item of content) is determined as a result of convolutions of a deep neural network. Typically, embedding information for an item of content is output by a deep neural network in the form of an "embedding vector." Due to the inclusion of plural aspects of an item, an embedding vector is viewed as being multi-dimensional with each aspect corresponding to a particular dimension. In this regard, embedding vectors may include any number of aspects, each corresponding to a dimension. In various embodiments, each aspect of an embedding vector is represented by a 16-bit word or a 32-bit float, which results in embedding vectors being large in size, e.g., 512 bytes long for example.

Locality-sensitive hashing, or LSH, is often viewed as an effort in "quantization." Quantization is the process of mapping a large set of input values, typically highly dimensional input values, to a smaller, manageable set of partitions. In the context of nearest-neighbor search, this means mapping items of a large corpus of items (i.e., millions or billions of items) into a manageable set of partitions or buckets, such that the elements of any given bucket have a high likelihood of being similar. Each item is associated with an embedding vector that, when processed by a quantization/mapping function, Q, results in a binary value corresponding to a bucket of the set of buckets/partitions. This mapping of an embedding vector/input value to a binary value representative of a partition is denoted as:

$$Q(ev_i) => b_i$$

where $ev_i$ is the embedding vector associated with an item of content having a dimension D, and $b_i$ is the binary value identifying the corresponding bucket or partition for the item according to the function Q. Moreover, $b_i$ has a dimension or size of B bits, where B bits is of sufficient size to uniquely identify (in binary) each bucket/partition.

Figure 1A:
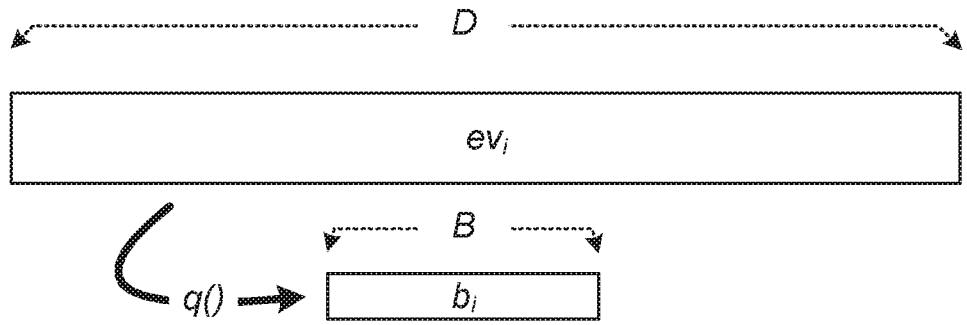
FIGS. 1A-1C are block diagrams illustrating the processing of an embedding vector into a binary value corresponding to an LSH bucket according to various processing techniques.
Figure 1B:
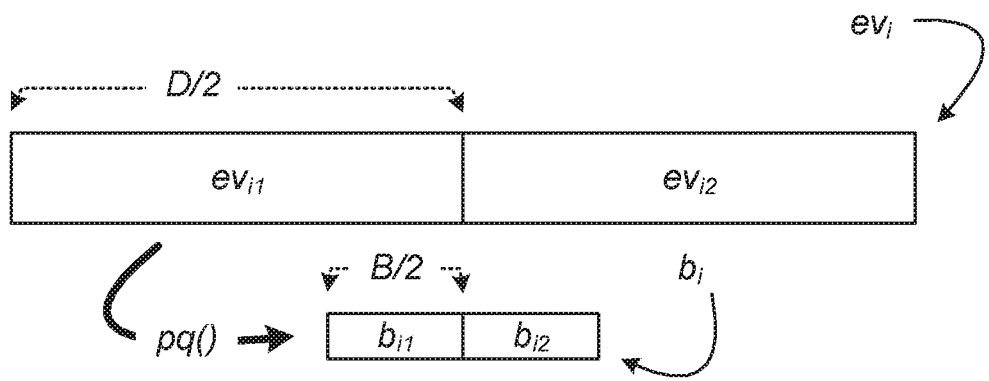
Figure 1C:
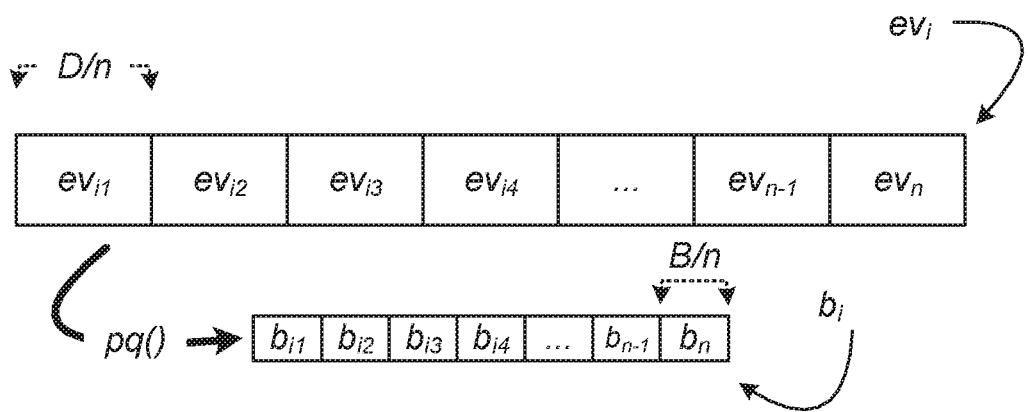

Turning to the figures, FIG. 1A-1C are block diagrams illustrating the processing of an embedding vector into a binary value corresponding to an LSH bucket according to various processing techniques. More particularly, as shown in FIG. 1A, the embedding vector, $ev_i$ is associated with an item of content and is processed by the quantization function Q to produce binary value $b_i$ that identifies the bucket into which the item of content is mapped.

As indicated above, $ev_i$ has a dimension D, and $b_i$ has a dimension of B bits. In typical implementations, $ev_i$ is an embedding vector that maps the item of content into a highly multi-dimensional space. By way of illustration and not limitation, in various actual embodiments, the dimension D of an input value is 256 or even 512 words long, and the dimension B of the result value is 16 bits (e.g., a signed 16-bit word). On the other hand, as those skilled in the art will appreciate, mapping a given item to one or a set of buckets, at this general level of quantization, involves a significant degree of computation complexity O as reflected in the formula:

$$O(D \cdot 2^B)$$

This type of quantization, as may be produced using a variety of techniques such as K-means clustering, works well when the number of items is relatively small and the number of buckets is also relatively small. As those skilled in the art will appreciate, K-means clustering partitions a multi-dimensional space into X clusters. As a new item is mapped into the clustered space, the new item is said to belong to the cluster with the nearest mean, where the means of each cluster serve as a prototype of the cluster, referred to as a centroid for the cluster. This type of clustering results in a partitioning of the multi-dimensional data space into Voronoi cells. Conceptually, mapping an embedding vector of an input item into one of X partitions involves two steps: a projection step and a mapping step. In the projection step, the input item (such as embedding vector $ev_i$) is projected into or onto the multi-dimensional surface that is divided into X distinct partitions, i.e., the Voronoi cells. Once projected onto this multi-dimensional surface, the hashing step is applied to identify (i.e., map) to which bucket the input item belongs. This is done by comparing the projected point of the input item to the centroids of the X buckets to identify the closest centroid to the projected point and selecting the bucket or partition of that closest centroid.

Clearly, however, the computational complexity described above increases both linearly with the number of buckets, where $X=2^B$, and exponentially with the number of bits B per term. Similarly, complexity (in identifying a nearest neighbor) greatly increases as the number of items to compare within a given bucket becomes large. To address this, an improved technique for mapping input values (high-dimensional embedding vectors) into binary values corresponding to buckets is known as product quantization.

In product quantization, the input value (e.g., embedding vector $ev_i$) is subdivided into two or more partitions. For example, as shown in FIG. 1B, embedding vector $ev_i$ is subdivided into two partitions, $ev_{i2}$ and $ev_{i2}$. Correspondingly, the binary result $b_i$ is subdivided into the same number of partitions (two), $bi_1$ and $bi_2$. Each partition of the embedding vector $ev_i$ is separately (independent from other partitions) mapped to a corresponding binary result partition of the binary result $b_i$. Overall, the mapping of the embedding vector $ev_i$ to a binary result $b_i$ is denoted as:

$$PQ(ev_i) => b_i$$

More specifically, the mapping function is denoted as follows:

$$PQ(ev_i) = |_{m=1}^{n} (Q(ev_{im}) => b_{im})$$

As indicated above and in this example, while $ev_i$ has a dimension D, each partition of $ev_i$ has a dimension of D/2.

Moreover, the computation of each computation generates a binary result of B/2 bits, cutting the exponential factor by half. Accordingly, the computational complexity for each partition can be expressed as:

$$O_P\left(\frac{D}{2} \cdot 2^{B/2}\right)$$

Because, in this example, there are two partitions, the overall complexity for computing the binary result $b_i$ for embedding vector $ev_i$ is as follows:

$$O_P\left(\frac{D}{2} \cdot 2^{B/2}\right) + O_P\left(\frac{D}{2} \cdot 2^{B/2}\right)$$

This equation reduces to show the computation complexity of product quantization with two partitions as being:

$$O(D \cdot 2^{B/2})$$

In short, using product quantization with two partitions, we can reduce the computation complexity of computing the binary result (LSH bucket) for an input item by an exponential factor of half! Assuming, for illustration and not limitation, that B is 8 bits, using product quantization with two partitions reduces the computational complexity from $D \cdot 2^8$ to $D \cdot 2^4$, a significant reduction in complexity!

Of course, as suggested above, product quantization is not limited to breaking the input into just two partitions. For example, and as shown in FIG. 1C, the input value (embedding vector) can be split into n distinct partitions, with each partition $ev_{i1}$-$ev_{in}$ of the input embedding vector $ev_i$ having a dimension of D/n, and each partition of the binary result $bi_1$-$bi_n$ has a dimension of B/n. The computational complexity of product quantization using n partitions is $$O(D \cdot 2^{B/n})$$

Unfortunately, as the number of n increases, the quality of the mapping of the input value to a bucket is reduced, with greater chances that dissimilar input values are mapped to the same bucket. In this regard, determining the number of n becomes a matter of computational bandwidth available and the responsiveness desires. In short, n is the lowest number (with a limit of 1) that, when used, can be computed with desired responsiveness through available computation bandwidth. In various embodiments and by way of illustration and not limitation, this value may be determined to be 4 or eight (i.e., a power of 2 such that the identifier can be efficiently stored in bits), though a value of 3 or 5 may also be implemented.

Underlying the quantization approaches discussed above are techniques that divide a multi-dimensional space into cells (each cell having its own centroid), maps the embedding vector into the multi-dimensional space, determines the closest centroid for the mapped vector, and identifies the binary result according to the closest centroid. One such technique that is frequently used, though not an exclusive technique, is the previously mentioned K-means clustering. However, as indicated above, the computational complexity of product quantization using the K-means clustering remains significant. Further, in using K-means clustering one must actually compute the K-means, which can be expensive itself. For comparison, the Orthoplex LSH solution described in this document does not have this pre-computation step.

According to aspects of the disclosed subject matter, rather than using K-means clustering, an alternative mechanism to subdivide the multi-dimensional space is to inscribe an orthoplex within that multi-dimensional space. An orthoplex (or cross-polytope) is a regular, convex polytope that exists in n-dimensions. The vertices of an orthoplex can be chosen as the unit vectors pointing along each co-ordinate axis, i.e., all the permutations of ($\pm 1, 0, 0, \ldots, 0$).

Figure 2:
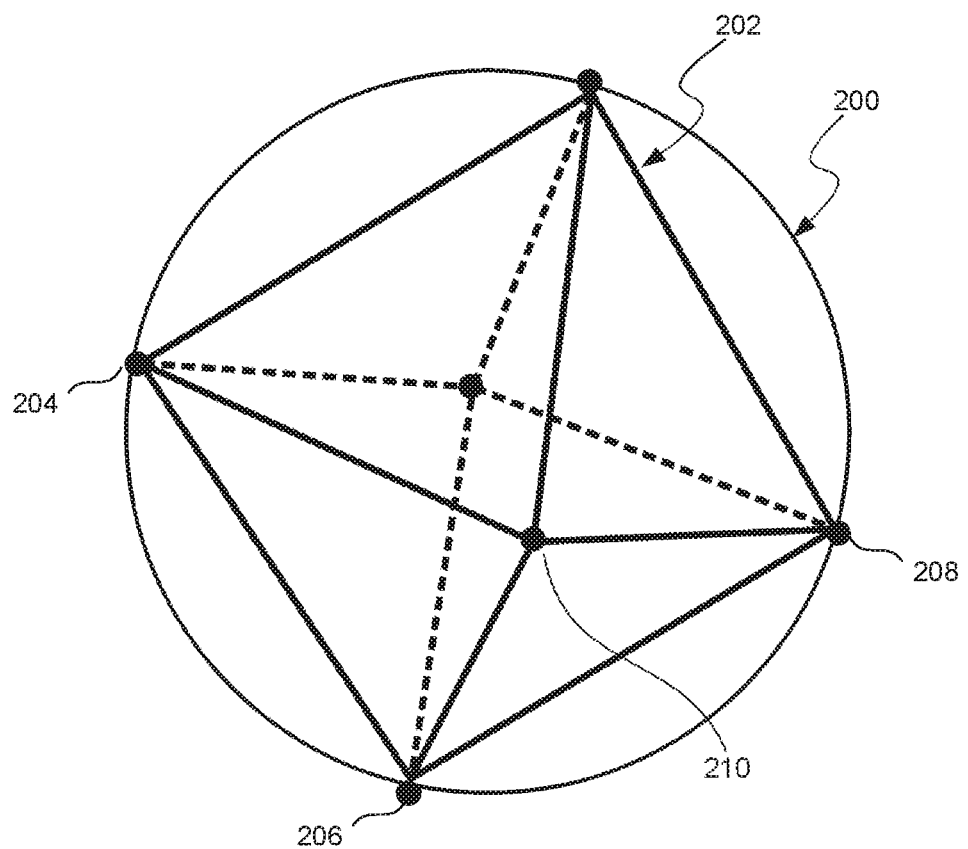
FIG. 2 is a block diagram illustrating an exemplary orthoplex (or cross-polytope) inscribed or oriented within a sphere in accordance with aspects of the disclosed subject matter.

In accordance with aspects of the disclosed subject matter, the orthoplex, is projected within the multi-dimensional sphere, effectively subdividing the sphere/space into uniform surfaces or cells. Moreover and according to additional aspects of the disclosed subject matter, rather than computing centroids for the various surfaces within the space or sphere, each vertex of the orthoplex represents (or is viewed as) the centroid for the surrounding surface. FIG. 2 is a block diagram illustrating an exemplary orthoplex 202 (cross-polytope) within a 2-dimensional sphere 200. In this illustration, the orthoplex 202 is referred to as an octahedron. Additionally and according to aspects of the disclosed subject matter, each vertex, such as vertices 204-210, of the orthoplex is viewed as a centroid for the surrounding surface/area of the orthoplex 202.

According to various embodiments of the disclosed subject matter, a single, axis-aligned orthoplex may be inscribed within the multi-dimensional sphere. In this configuration, one computes multiple terms for the same embedding by using an implementation of the Fast Hadamard Transform to rotate a given embedding differently based on different pseudo-random rotation matrices. This is equivalent to keeping embeddings fixed and rotating the orthoplex. On the other hand and according to alternative aspects of the disclosed subject matter, by rotating the embeddings within the multi-dimensional sphere and leaving the orthoplex fixed and aligned with a convenient coordinate system, the computations can take advantage of the convenient coordinates of the axis-aligned orthoplex to locate nearest orthoplex vertices more efficiently.

To further improve the performance of hashing function and according to aspects of the disclosed subject matter, the input vector is pseudo-randomly within the multi-dimensional sphere (also referred to as a hypersphere). Advantageously, searching for the nearest orthoplex vertex is computationally efficient due to the symmetric distribution of the orthoplex vertex coordinates. Effectively, finding the nearest vertex simply determined by taking the index of the highest absolute coordinate of the rotated embedding. With this rotation, the identification of the bucket or partition (corresponding to a vertex in the orthoplex) is simply the resulting vertex. According to additional aspects of the disclosed subject matter, this pseudo-random rotation can be efficiently carried out using the Fast Hadamard Transform (FHT), also known as the Walsh Hadamard Transform. Advantageously, the computational complexity of computing the pseudo-random rotation using the Fast Hadamard Transform to identify the bucket into which the input item is mapped is:

$$O(B \cdot 2^B)$$

Further still and according to aspects of the disclosed subject matter, the pseudo-random rotation using the Fast Hadamard Transform may be efficiently carried out using one or more GPUs, thereby increasing the performance in computing the identity of the partition to which the input item is mapped.

As suggested above regarding product quantization, efficiencies are realized when partitioning the input item into n partitions. Similarly and according to aspects of the disclosed subject matter, efficiencies are realized in mapping input items into an orthoplex when the input item is partitioned into those same n partitions. This type of quantization, i.e., partitioning the multi-dimensional space with an orthoplex and identifying the centroid through the use of pseudo-random rotations, is referred to as Orthoplex Quantization. For comparison and to illustrate the efficiencies gained over Product Quantization, the complexities for classic Product Quantization and Orthoplex Quantization are as follows:

Product Quantization → $O(D \cdot 2^{B/n})$

Orthoplex Quantization → $O(B \cdot 2^{B/n})$

Clearly, when the dimensionality of the input vectors, D, is significantly larger than the number of bits B sufficient to identify each LSH partition, using the orthoplex quantization yields significantly improved performance. As those skilled in the art will appreciate, generally speaking D is significantly larger than B, i.e., B<<D. Assuming, by way of illustration and not limitation, that a common length of D is 256 words (16 bits/word or 4096 bits) and that a common number of bits (i.e., B) is 64, the computational complexity of Orthoplex Quantization is substantially more efficient than Product Quantization, indeed several orders of magnitude more efficient.

As indicated above, LSH can be advantageously applied in regard to search, including searching for the same or similar items from among a corpus of items for a given or received input item. Indeed, LSH is particularly useful for matching an input query q to the same or similar items in a very large corpus of items. Further still and according to aspects of the disclosed subject matter, LSH that utilizes the Orthoplex Quantization described above are significantly enhanced.

Figure 3:
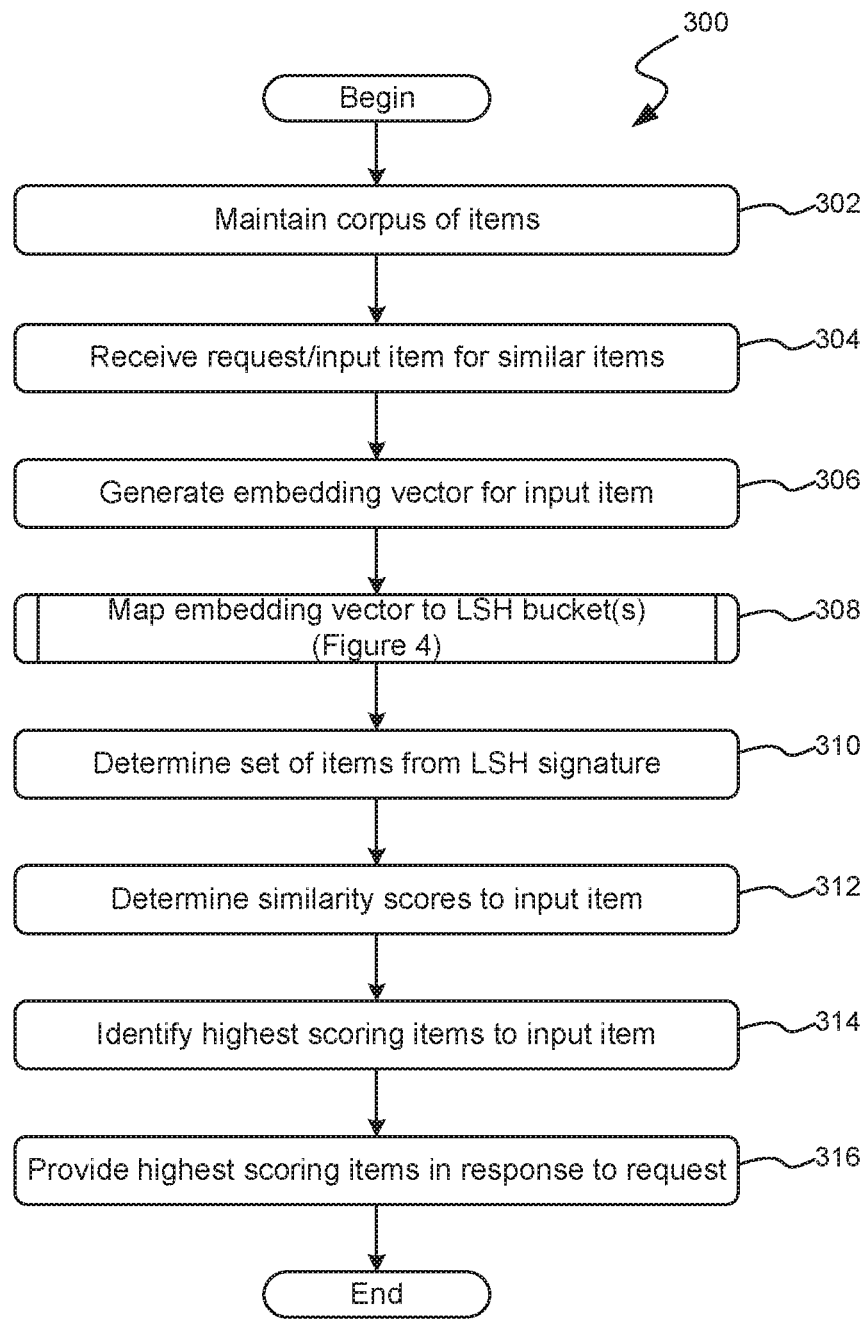
FIG. 3 is a flow diagram illustrating an exemplary routine suitable for conducting a search for the same or similar items from among a corpus of items for a given input item in accordance with aspects of the disclosed subject matter.

Turning to FIG. 3, FIG. 3 is a flow diagram illustrating an exemplary routine 300 suitable for conducting a search for the same or similar items from among a corpus of items for a given input item. Beginning at block 302, a search engine or search service maintains a corpus of items. According to aspects of the disclosed subject matter, the various items of this corpus have been mapped (via an LSH process utilizing the Orthoplex Quantization process described above) to one of a plurality of buckets. Indeed, the number of buckets is less than or equal to $2^B$, where B identifies the number of bits that is necessary to uniquely identify each bucket or partition. According to various embodiments of the disclosed subject matter, the LSH mapping is associated with each of the items of the corpus of items, and an index of items according to buckets may be maintained. As should be appreciated, maintaining the corpus of items with corresponding LSH buckets may be carried asynchronously from the remainder of the method, particularly in regard to identifying similar or same content. Additionally, embedding vectors are for each of the various items in the corpus of items. By way of illustration and not limitation, the corpus of items may comprise a plurality of images, where each image has been hashed (as described below) to one of $2^B$ of buckets.

At block 304, an input item is received in the form of a request for the same or similar content. At block 306 and according to aspects of the disclosed subject matter, an embedding vector is generated for the input item. Continuing the example from above, the request/input item may correspond to an input image for which the search service is to find the same or similar images. Generating embedding vectors for input items, including for images, is known in the art. As will be appreciated by those skilled in the art, deep neural networks or other machine learning models are typically trained to generate embedding vectors that represent various aspects and/or elements of the input values.

At block 308, after having generated an embedding vector for the input item of the request, the input item (via its embedding vector) is mapped to at least one but typically several of the $2^B$ of buckets, where the items mapped to a given bucket have a high likelihood of being the closest matches among themselves in the corpus of items. This mapping results in a type of LSH signature for the input item, that includes the bucket(s) to which the embedding vector is mapped. According to aspects of the disclosed subject matter, this mapping is carried out as an LSH mapping using the Orthoplex Quantization process described above. A more detailed description of utilizing the Orthoplex Quantization process is set forth in regard to FIG. 4.

Figure 4:
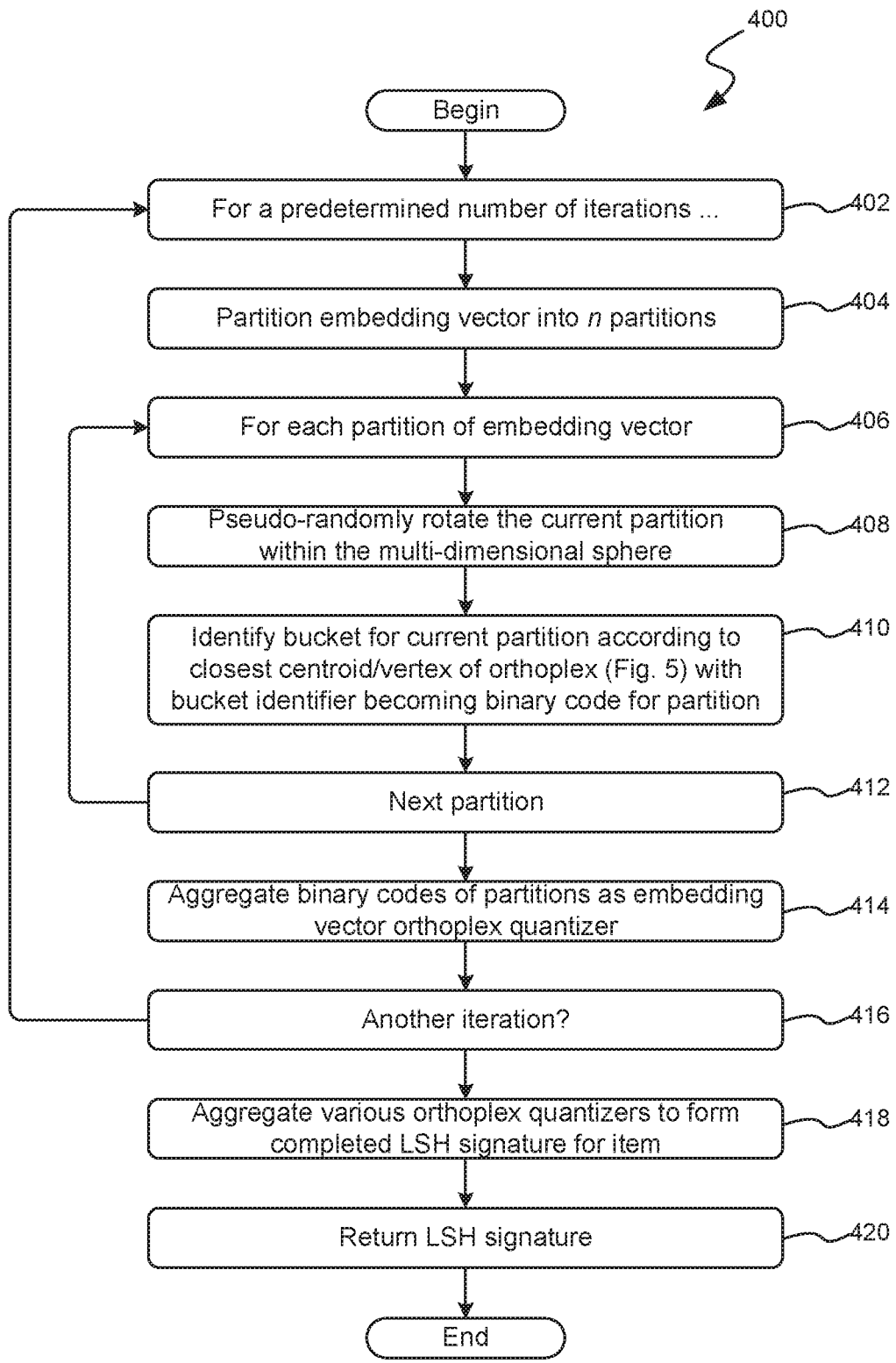
FIG. 4 is a flow diagram illustrating an exemplary routine suitable for mapping an embedding vector to a bucket or partition within a multi-dimensional sphere using Orthoplex Quantization in accordance with aspects of the disclosed subject matter.

Turning to FIG. 4, FIG. 4 is a flow diagram illustrating an exemplary routine 400 suitable for mapping an embedding vector to a bucket or partition within a multi-dimensional sphere using Orthoplex Quantization. At block 402, an iteration is begun to iteratively map the embedding vector of an item into the orthoplex according to a plurality of LSH functions, thereby generating an overall, aggregated LSH signature for the embedding vector. Indeed, the aggregated LSH signature comprises a sequence of LSH signatures to which the embedding vector is typically mapped by a series of LSH mapping functions.

According to aspects of the disclosed subject matter, this iteration of block 402 is carried out for a predetermined number of iterations. While a single iteration (one LSH mapping) could be used as an LSH signature, using a single LSH mapping incurs a risk of two similar embedding vectors being mapped to different LSH buckets due to some "feature" of the LSH mapping function. To reduce these types of risks, multiple LSH mappings using distinct LSH mapping functions, along with the pseudo-random rotations described below, ensure that the quirks of any single LSH mapping function that would map similar embedding vectors to distinct LSH buckets are overcome or, at least, significantly minimized.

At block 404, the embedding vector is partitioned into n partitions. As discussed above and according to aspects of the disclosed subject matter, this partitioning enables greatly improved computational performance by using smaller values. After having partitioned the embedding vector into n partitions, at block 406 an iteration loop is begun to iterate through each of the partitions, projecting or mapping them into the orthoplex as described below.

At block 408, the current partition is projected and pseudo-randomly rotated within the multi-dimensional sphere. Advantageously, though each partition is pseudo-randomly rotated, since the orthoplex is axis-aligned and having convenient coordinate values, locating the closest orthoplex vertex or vertices requires only a linear scan of the embedding rotated in the orthoplex space. According to various aspects of the disclosed subject matter, this pseudo-random rotation is carried out using a Fast Hadamard Transform. Further still, the pseudo-random rotation may be carried out on one or more graphic processing units (GPUs) which are well suited to carry out the Fast Hadamard Transforms efficiently (especially in comparison to conducting these transforms on general CPUs —central processing units.)

According to aspects of the disclosed subject matter, it should be appreciated that pseudo-random rotations work just as well as truly random rotations. More particularly and according to aspects of the disclosed subject matter, empirical evidence suggests that three applications of the pseudo-random rotations (via the Fast Hadamard Transform of H and $D_i$) is optimal, where i is a random diagonal ±1-matrix, and where $i \in \{1, 2, 3\}$ according to the formula:

$$x \rightarrow HD_3HD_2HD_1x$$

At block 410, the LSH bucket or partition of the multi-dimensional space, into which the current partition is mapped, is readily identified, as suggested above. More particularly, the identified LSH bucket corresponds to the vertex of the cell to which the currently iterated partition is mapped, i.e., the closest vertex of the orthoplex. Routines 500 and 600, discussed below, address the identification of the closest vertex of the orthoplex to the currently iterated and mapped partition and, according to additional aspects of the disclosed subject matter, further ensure that the mapped items are evenly distributed among the various partitions/buckets. This LSH bucket identifier forms a part of the orthoplex quantizer for the current LSH iteration (started in block 402) of the embedding vector.

At block 412, if there are additional partitions to process, the routine 400 returns to block 406 where a next partition is selected as the currently iterated partition and processed through the steps set forth above. Alternatively, if all the partitions are processed, the routine 400 proceeds to block 414.

At block 414, the various binary codes (corresponding to the identified LSH buckets to which the partitions were mapped) are aggregated as a partial LSH signature for the current iteration. According to aspects of the disclosed subject matter, this partial LSH signature, aggregated with other partial LSH signatures as set forth below, forms an overall LSH signature for the embedding vector which can be used to identify the item represented by the embedding vector to other items in a corpus of items that are most likely the same or similar to the current item.

After identifying the LSH signature of the embedding vector for the current iteration, at block 416, if there are additional iterations to perform, the routine 400 returns to block 402 for an additional mapping by additional LSH mapping functions. Alternatively, if all the predetermined iterations have been completed, the routine 400 proceeds to block 418.

At block 418, the partial LSH signatures to which the embedding vector has been "mapped" are aggregated together to form an overall, aggregated LSH signature for the input item (via the input items' embedding vector.) At block 420, this overall, aggregated LSH signature is returned. Thereafter, the routine 400 terminates.

Returning to routine 300 of FIG. 3, at block 310, a set of items of the corpus of items that have been mapped to the identified bucket(s), i.e., the LSH signature for the input item as calculated by the LSH hashing using the Orthoplex Quantization technique discussed above, is determined. In accordance with various embodiments of the disclosed subject matter, items that have the same or nearly the same LSH signature (whether it is a single bucket identifier or a series of bucket identifiers) are included within this set of items. In various embodiments, a reverse index of various LSH buckets or signatures may be used to efficiently identify those items of the corpus of items that have the same or similar LSH signature.

At block 312, similarity scores are determined for each of the items of the set of items determined in block 310. This similarity score for each of the identified set of corpus items is determined according to a distance between the embedding vector for the corpus item and the embedding vector for the input item. According to one embodiment, this difference is measured according to a cosine similarity function which yields results between −1.0 and 1.0, with the higher numbers indicating a greater similarity.

At block 314, those corpus items having the highest similarity scores to the request/input item are identified. At block 316, at least some of the items in the identified set of corpus items having the highest similarity scores are presented to the requesting party in response to the search request. Thereafter, the routine 300 terminates.

Figure 5:
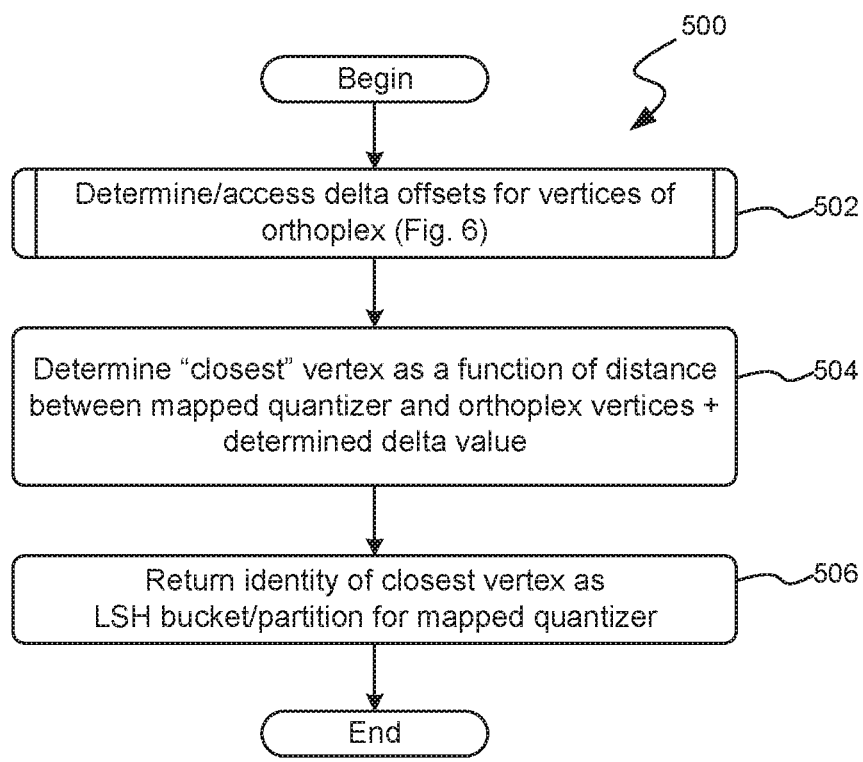
FIG. 5 is a flow diagram illustrating an exemplary routine suitable for mapping items to LSH partitions with balanced distribution and in accordance with aspects of the disclosed subject matter.

Turning to FIG. 5, FIG. 5 is a flow diagram illustrating an exemplary routine 500 suitable for mapping items to LSH partitions/buckets with balanced distribution in accordance with aspects of the disclosed subject matter. Indeed, according to aspects of the disclosed subject matter, a determination of which partition a given input item is mapped to is based on which vertex is closest to the mapped input item (mapped into the orthoplex). This is typically done using a cosine similarity operation between the mapped input item and the various vertices of the orthoplex. However, those skilled in the art will appreciate that distribution of input items into the multi-dimensional space/orthoplex is almost never uniform: i.e., there are concentrations of input values in some of the cells and there are sparsely populated cells. Additionally, when input values are concentrated into a few cells, the advantages of using LSH mapping, even using orthoplex quantization, is lessened. Accordingly, and as described below, additional effort may be made to provide for balanced distribution of input values into the multi-dimensional sphere. More particularly, multi-dimensional delta offsets are determined for the various vertices of the orthoplex, resulting in making it less likely that a given input item will be mapped to an otherwise frequently-mapped cell.

Beginning at block 502, delta offsets for each of the vertices of the orthoplex are determined and/or accessed. More particular, if the delta offsets have not yet been determined, at block 502 they are determined, and if they have already been determined, the information (delta offsets) is accessed. Determining delta offsets for the vertices of the orthoplex is set forth below in regard to routine 600 of FIG. 6.

Figure 6:
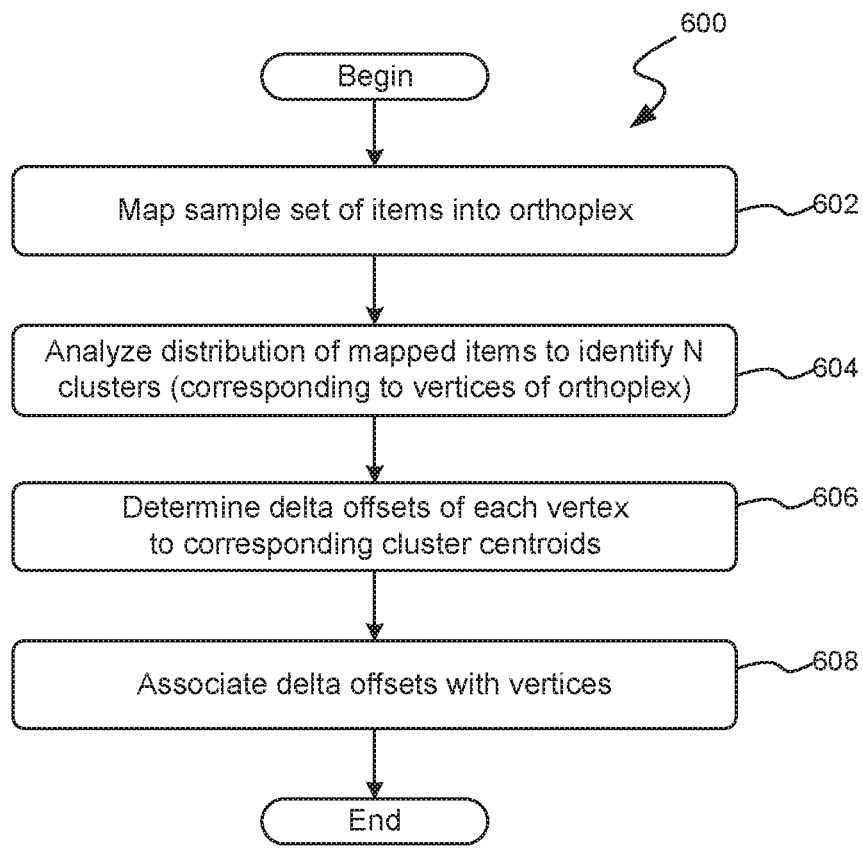
FIG. 6 is a flow diagram illustrating an exemplary routine suitable for determining delta offsets for the vertexes of an orthoplex according to aspects of the disclosed subject matter.

Turning to FIG. 6, FIG. 6 is a flow diagram illustrating an exemplary routine 600 suitable for determining delta offsets of vertices of the orthoplex in accordance with aspects of the disclosed subject matter. Beginning at block 602, a sample set of items—sufficiently large to produce a representative distribution of the items within the multi-dimensional sphere—is accessed and mapped into the orthoplex within the multi-dimensional sphere. According to various embodiments of the disclosed subject matter, as the determinations will typically be conducted in an asynchronous manner to user requests for information, this sample set may include a very large number of the available input items within the corpus of input items. Indeed, in some embodiments at least 30% of the input items are included as part of the sample set. Alternatively, all items of the corpus of items may be included in the sample set given that the determinations are made asynchronously to a user request.

At block 604, an analysis of the mapped items may be made which includes identifying clusters within the multi-dimensional sphere. According to various embodiments of the disclosed subject matter, this may include using the classic K-means clustering algorithm to identify the clusters within the multi-dimensional sphere. Ideally, but not necessarily, the clustering of the items results in the same number of clusters as there are vertices in the orthoplex.

This analysis further includes an evaluation of the resulting clusters with the vertices of the orthoplex. This evaluation results in type of mapping of clusters to vertices in a way to make it less likely that clustered items will be mapped to the same vertex. At block 606, a delta offset is determined for each of the vertices in the orthoplex. Indeed, while the size of the symmetrical areas of each surface in the orthoplex need not be changed, the net effect is that the delta offset (a multi-dimensional scaler) added to the cosine similarity value between an input value and an orthoplex vertex makes the surface of that cell of that vertex larger or smaller, depending on whether the intent is to increase the number of input items mapped to that vertex, decrease the number of input items mapped to that vertex, or leave the distribution to that vertex alone.

After having determined the delta offsets for each vertex of the orthoplex, at block 608, these delta offsets are associated with the vertices such that they can be subsequently recalled and used. Thereafter, routine 600 terminates.

Returning again to routine 500, after having determined and/or accessed the delta offsets of the vertices, at block 504, a determination of the "closest" vertex to the mapped partition is made. According to aspects of the disclosed subject matter, more particularly this determination is made as a function of the distance between the mapped partition and orthoplex vertices, in view of the determined delta offsets of the vertices. This distance determination follows the form:

$$s = \text{cosineSimilarity}(ev_{input}, x) + \Delta_x$$

where s is the effective distance between the input item's embedding vector, $ev_{input}$, and a given vertex, $v_x$, and where $\Delta_x$ is the delta offset corresponding to the given vertex. Advantageously, the modification of cosine similarity to the vertex does not insignificantly impact the overall complexity of mapping an input item to a vertex (and its corresponding partition or bucket.)

With the effective distances between the input item's embedding vector and the various vertices of the orthoplex (as modified according to associated delta offsets), the nearest vertex is selected.

At block 506, the identity of closest vertex is returned as the LSH bucket/binary code for the mapped partition of the input item. Thereafter, routine 500 terminates.

Regarding routines 300-600 described above, while these routines are expressed as discrete, descriptive steps, these steps should be viewed as being logical in nature and may or may not correspond to any specific actual and/or discrete execution steps of a given implementation. Also, the order in which these steps are presented in the various routines, unless otherwise indicated, should not be construed as the only or best order in which the steps may be carried out. Moreover, in some instances, some of these steps may be combined and/or omitted. Optimizations of routines may be carried out without modifying the underlying functionality described herein. Those skilled in the art will recognize that the logical presentation of steps is sufficiently instructive to carry out aspects of the claimed subject matter irrespective of any specific development or coding language in which the logical instructions/steps are encoded. Additionally, while some of these routines are expressed in the context of recursive routines, those skilled in the art will appreciate that such recursive routines may be readily implemented as non-recursive calls without actual modification of the function or result. Accordingly, the particular use of programming and/or implementation techniques and tools to implement a particular functionality should not be construed as limiting upon the disclosed subject matter.

Of course, while these routines include various novel features of the disclosed subject matter, other steps (not listed) may also be included and carried out in the execution of the subject matter set forth in these routines, some of which have been suggested above. Those skilled in the art will appreciate that the logical steps of these routines may be combined or be comprised of multiple steps. Steps of the above-described routines may be carried out in parallel or in series. Often, but not exclusively, the functionality of the various routines is embodied in software (e.g., applications, system services, libraries, and the like) that is executed on one or more processors of computing devices, such as the computing device described in relation to FIG. 8 below. Additionally, in various embodiments all or some of the various routines may also be embodied in executable hardware modules including, but not limited to, systems on chips (SoC's), codecs, specially designed processors, logic arrays and/or logic circuits, and the like.

As suggested above, these routines are typically embodied within executable code blocks and/or modules comprising routines, functions, looping structures, selectors and switches such as if-then and if-then-else statements, assignments, arithmetic computations, and the like. In execution, these various executable constructs configure a computing device to operate in accordance with the routines/processes. However, the exact implementation in executable statement of each of the routines is based on various implementation configurations and decisions, including programming languages, compilers, target processors, operating environments, and the linking or binding operation. Those skilled in the art will readily appreciate that the logical steps identified in these routines may be implemented in any number of ways and, thus, the logical descriptions set forth above are sufficiently enabling to achieve similar results.

While many novel aspects of the disclosed subject matter are expressed in routines embodied within applications (also referred to as computer programs), apps (small, generally single- or narrowly-purposed applications), online services and/or methods, these aspects may also be embodied as computer executable instructions stored by computer readable media, also referred to as computer readable storage media, which are articles of manufacture. As those skilled in the art will recognize, computer readable media can host, store and/or reproduce computer executable instructions and data for later retrieval and/or execution. When the computer executable instructions that are hosted and/or stored on the computer readable storage devices are executed by a processor of a computing device or computing system, the execution thereof causes, configures and/or adapts the executing computing device or system to carry out various steps, methods and/or functionality, including those steps, methods, and routines described above in regard to the various illustrated routines and/or processes. Examples of computer readable media include but are not limited to: optical storage media such as Blu-ray discs, digital video discs (DVDs), compact discs (CDs), optical disc cartridges, and the like; magnetic storage media including hard disk drives, floppy disks, magnetic tape, and the like; memory storage devices such as random-access memory (RAM), read-only memory (ROM), memory cards, thumb drives, and the like; cloud storage (i.e., an online storage service); and the like. While computer readable media may reproduce and/or cause to deliver or transmit the computer executable instructions and data to a computing device for execution by one or more processors via various transmission means and mediums, including carrier waves and/or propagated signals, for purposes of this disclosure computer readable media expressly excludes carrier waves and/or propagated signals.

Figure 7:
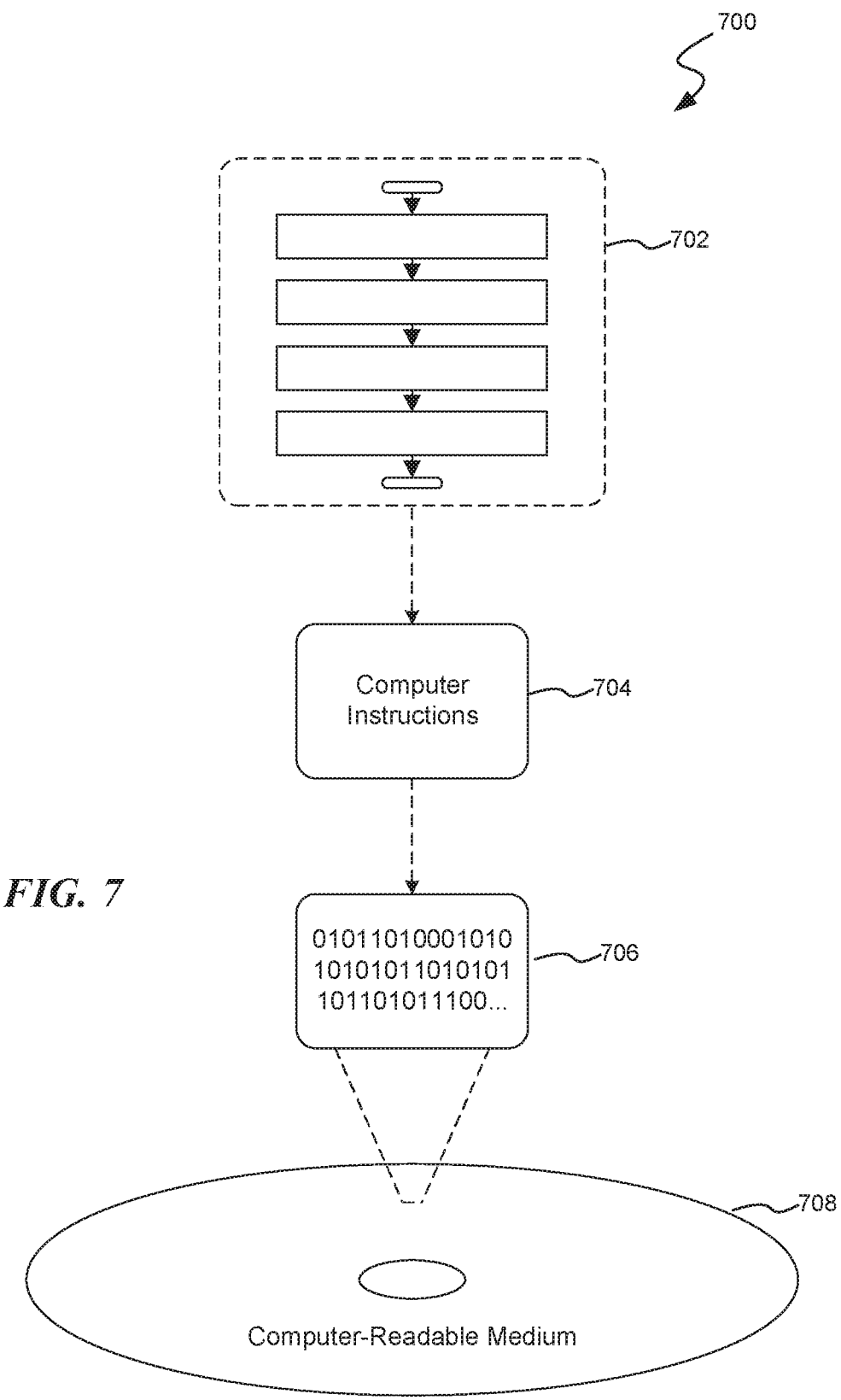
FIG. 7 is a block diagram illustrating an exemplary computer readable medium encoded with instructions for responding to a request for similar items from a corpus of items in accordance with aspects of the disclosed subject matter.

Regarding computer readable media, FIG. 7 is a block diagram illustrating an exemplary computer readable medium 708 encoded with instructions 704 for responding to a request for similar items from a corpus of items, in accordance with aspects of the disclosed subject matter. More particularly, the implementation 700 comprises a computer-readable medium 708 (e.g., a CD-R, DVD-R or a platter of a hard disk drive), on which is encoded computer-readable data 706. This computer-readable data 706 in turn comprises a set of computer instructions 704 configured to operate according to one or more of the principles set forth herein. In one such embodiment 702, the processor-executable instructions 704 may be configured to perform a method, such as at least some of exemplary routines 300-600 set forth in FIGS. 3-6, for example. In another such embodiment, the processor-executable instructions 704 may be configured to implement a system on a computing device, such as at least some of the exemplary, executable components of computing device 800 of FIG. 8, as described below. Many such computer readable media may be devised, by those of ordinary skill in the art, which are configured to operate in accordance with the techniques presented herein.

Figure 8:
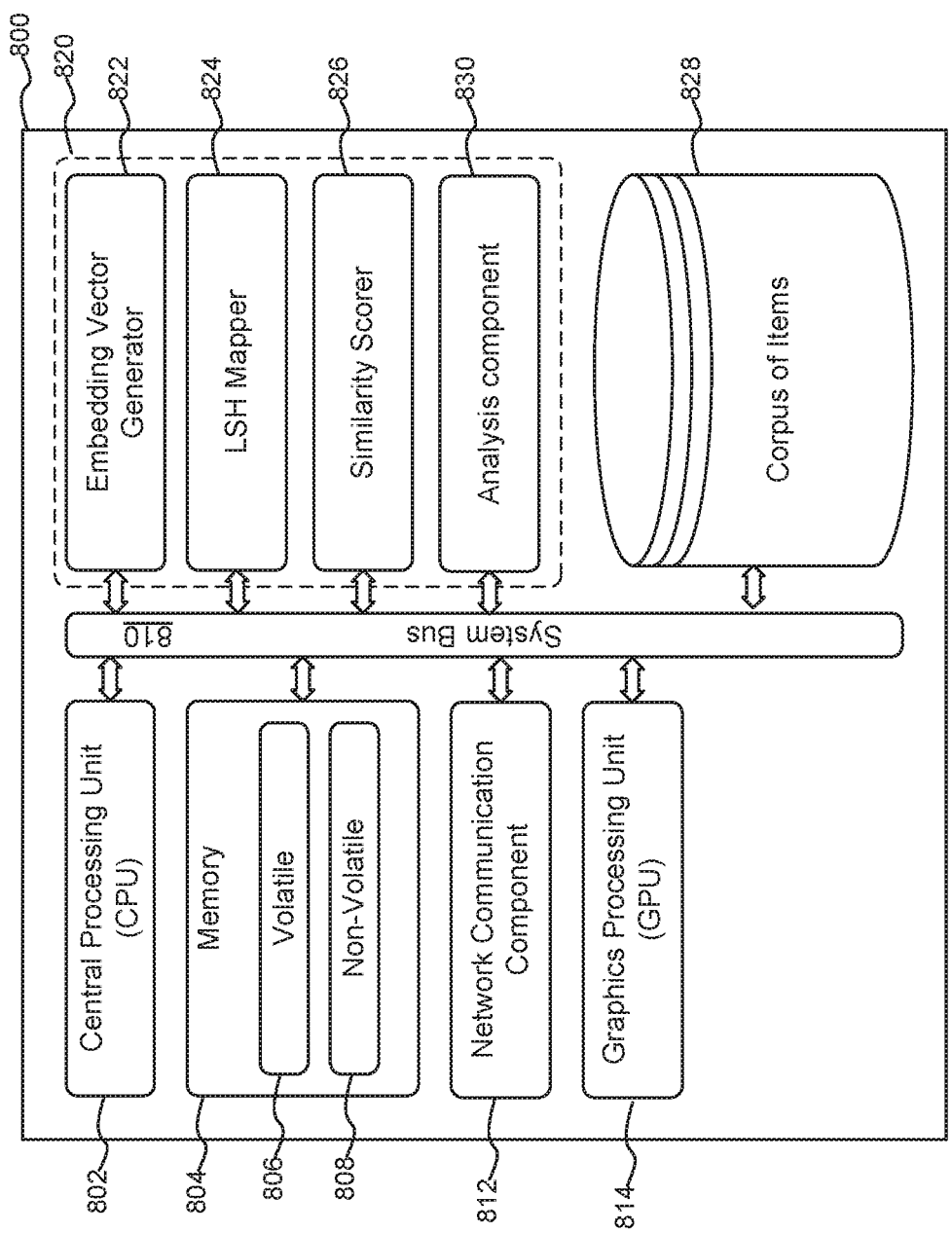
FIG. 8 is a block diagram illustrating an exemplary computer system suitably configured for responding to a request for similar items to an input item from a corpus of items according to aspects of the disclosed subject matter.

Turning now to FIG. 8, FIG. 8 is a block diagram illustrating an exemplary computer system 800 suitably configured for responding to a request for similar items to an input item from a corpus of items according to aspects of the disclosed subject matter. As those skilled in the art will readily appreciate, a typical computing system, such as computing system 800, includes one or more central processing units (or CPUs), such as CPU 802, and further includes at least one memory 804. The CPU 802 and memory 804, as well as other components of the computing system, are typically interconnected by way of a system bus 810.

As will be further appreciated by those skilled in the art, the memory 804 typically (but not always) comprises both volatile memory 806 and non-volatile memory 808. Volatile memory 806 retains or stores information so long as the memory is supplied with power. In contrast, non-volatile memory 808 is capable of storing (or persisting) information even when a power supply is not available. Generally speaking, RAM and CPU cache memory are examples of volatile memory 806, whereas ROM, solid-state memory devices, programmable logic arrays, EPROMs, memory storage devices, and/or memory cards are examples of non-volatile memory 808.

As will be further appreciated by those skilled in the art, in operation the CPU 802 executes instructions retrieved from the memory 804, from computer readable media, such as computer readable media 708 of FIG. 7, and/or other executable components in carrying out the various functions of the disclosed subject matter. The CPU 802 may be comprised of any number of available processors such as single-processor, multi-processor, single-core units, and multi-core units, which are well known in the art.

Further still, the illustrated computing system 800 typically includes a network communication interface 812 for interconnecting the computing system with other devices, computers and/or services over a computer network. The network communication interface 812, sometimes referred to as a network interface card or NIC, communicates over the network using one or more communication protocols via a physical/tangible (e.g., wired, optical fiber, etc.) connection, a wireless communication protocol such as WiFi or Bluetooth communication protocols, NFC, or a combination of both. As will be readily appreciated by those skilled in the art, a network communication interface, such as network communication component 812, is typically comprised of hardware and/or firmware components (and may also include or comprise executable software components) that transmit and receive digital and/or analog signals from other components and/or devices over a transmission medium (e.g., the network).

The exemplary computing system 800 is further illustrated as including a Graphics Processing Unit 814 or GPU. A GPU 814, also occasionally called visual processing unit or VPU, is a specialized electronic circuit designed to rapidly manipulate and alter memory to accelerate the creation of images in a frame buffer intended for output to a display. GPUs are often used in embedded systems, mobile phones, personal computers, workstations, and game consoles. Due to its designed ability to efficiently and rapidly manipulate memory, GPUs are also readily applied to computations that involve manipulating substantial amounts of memory, such as the Fast Hadamard Transform mentioned above. While some computing systems include GPUs, such as illustrated in computing system 800, in other circumstances GPUs may be deployed as a service and accessed over a network.

The exemplary computing system 800 further includes components that, in execution on the computing system, operate to provide a search service for responding to a request with the same or similar items to an input item from a corpus of items. This collection 820 of logical, executable components includes, by way of illustration and not limitation, an embedding vector generator 822, an LSH mapper 824, an analysis component 830 and a similarity scorer 826. In execution, the search service receives a request that includes an input item. This request is for the search service to identify, from a corpus of items stored in a data store 828, those items that are most similar to the input item.

As set forth above in regard to block 306 of routine 300 of FIG. 3, the search service 820, upon receiving an input item, generates an embedding vector for the item by way of the executable embedding vector generator 822. Generating embedding vectors for various items, including an input item as well as items within the corpus of content, is known to those skilled in the art. An example of training a deep neural network to generate an embedding vector for an item of content is set forth in commonly assigned and co-pending U.S. patent application Ser. No. 16/101,184, entitled "Efficient Convolutional Network for Recommender Systems," filed on Aug. 10, 2018, the entirety of which is incorporated herein by reference.

As set forth above in regard to block 308 of routine 300, the search service 820, maps the embedding vector of the input item into one of a plurality of partitions or buckets by way of an LSH mapper 824. As set forth above and in accordance with aspects of the disclosed subject matter, in execution the LSH mapper utilizes an Orthoplex Quantizer approach (described above) in determining the most likely bucket or partition for the input item.

As set forth above in regard to block 312 of routine 300, the search service 820, by way of an executable similarity scorer 826, determines similarity scores for the items within the identified bucket for the input item. These similarity scores reflect the similarity of the various items already belonging to the bucket to the input item (as a comparison of embedding vectors). In various embodiments, this similarity score is determined as a function of a cosine similarity operation such that the corpus items that are most similar to the input item have the highest scores.

As set forth above in regard to block 316 of routine 300, based on the similarity scores from the similarity scorer 824, the search service 820 responds to the request with at least some of the highest scoring items.

As set forth above in regard to block 406 of routine 400 of FIG. 4, the search service 820, in determining which partition to map the input item to, utilizes delta offsets to make sure that input items are mapped to the various partitions in a balanced manner. These delta offsets are determined according to an analysis carried out of the executable analysis component 830. Indeed, as more described in routines 500 and 600, the analysis component 830 conducts analysis of a sample set of input items to identify delta offsets to be associated with the various orthoplex vertices. These offsets effectively alter the likelihoods that a given input item will be mapped to a corresponding vertex, resulting in balanced distribution of the input items (i.e., via their embedding vectors) among the LSH partitions.

Regarding the various components of the exemplary computing device 800, those skilled in the art will appreciate that many of these components may be implemented as executable software modules stored in the memory of the computing device, as hardware modules and/or components (including SoCs—system on a chip), or a combination of the two. Indeed, components may be implemented according to various executable embodiments including, but not limited to, executable software modules that carry out one or more logical elements of the processes described in this document, or as a hardware and/or firmware components that include executable logic to carry out the one or more logical elements of the processes described in this document. Examples of these executable hardware components include, by way of illustration and not limitation, ROM (read-only memory) devices, programmable logic array (PLA) devices, PROM (programmable read-only memory) devices, EPROM (erasable PROM) devices, and the like, each of which may be encoded with instructions and/or logic which, in execution, carry out the functions described herein.

Moreover, while various novel aspects of the disclosed subject matter have been described, it should be appreciated that these aspects are exemplary and should not be construed as limiting. Variations and alterations to the various aspects may be made without departing from the scope of the disclosed subject matter.

What is claimed:

1. A computer implemented method for hashing an input item to a locality sensitive hashing (LSH) partition containing likely similar items from a corpus of items, the method comprising:

maintaining a corpus of items, wherein each item of the corpus of items is associated with an embedding vector generated for the item and a partition of a plurality of LSH partitions;

inscribing an orthoplex into a multi-dimensional space, wherein the orthoplex partitions the multi-dimensional space into symmetrical Voronoi surfaces, wherein each Voronoi surface has as its centroid a vertex of the orthoplex, and wherein each vertex is associated with one of the plurality of LSH partitions;

receiving a request for items from the corpus of items that are similar to the input item;

generating, using an embedding vector generator, an input embedding vector for the input item;

for a predetermined number of iterations:
  mapping, using an executable LSH mapper, the input embedding vector into the orthoplex;
  identifying the closest vertex of the orthoplex to the mapped input embedding vector; and
  identifying a partition of the plurality of LSH partitions associated with the identified vertex of the orthoplex as a partial LSH signature;

aggregating the partial LSH signatures as the LSH signature for the input item;

identifying those items of the corpus of items that are associated with the LSH signature as the likely similar items to the input item;

generating, using an executable similarity scorer, a similarity score for each identified item according to a similarity to the input item; and identifying a subset of items from the identified items, wherein the subset of items includes items of the identified items having the highest similarity scores.

2. The computer implemented method of claim 1:
wherein mapping the input embedding vector into the orthoplex comprises partitioning the input embedding vector into a plurality of partitions, and for each partition, mapping the partition into the orthoplex in the multi-dimensional space;
wherein identifying the closest vertex of the orthoplex to the mapped input item comprises, for each partition, identifying the closest vertex of the orthoplex to the mapped partition;
wherein identifying the partition of the plurality of LSH partitions associated with the identified vertex of the orthoplex as a partial LSH signature comprises aggregating the closest vertices of the mapped partitions as the partial LSH signature for the embedding vector.

3. The computer implemented method of claim 1, wherein:
the partition associated with each item within the corpus of items is determined according to the associated embedding vector of the item.

4. The computer implemented method of claim 3 further comprising conducting at least one pseudo-random rotation to orient the embedding vector associated with the input item with the orthoplex.

5. The computer implemented method of claim 4, wherein each rotation of the at least one pseudo-random rotation is carried out using a Fast Hadamard Transform.

6. The computer implemented method of claim 5, wherein each of the at least one pseudo-random rotation is carried out using the Fast Hadamard Transform on one or more graphic processing units (GPUs).

7. The computer implemented method of 1, wherein generating the similarity score for each of the identified items comprises, for each of the identified items:
  determining a score for an identified item according to the similarity between the embedding vectors of the identified item and the input embedding vector of the input item.

8. The computer implemented method of claim 1, wherein determining the score for the identified item according to the similarity between the embedding vectors of the identified item and the input embedding vector of the input item comprises determining the score according to a cosine similarity between the embedding vectors of the identified item and the input embedding vector of the input item.

9. A non-transitory computer readable medium bearing computer executable instructions which, when executed on a computing system comprising at least a processor executing the instructions, carry out a method for identifying a subset of items of a corpus of items having a high likelihood of similarity to an input item, the method comprising:
  maintaining a corpus of items, wherein each item within the corpus of items is associated with an embedding vector generated for the item and a partition of a plurality of locality sensitive hashing (LSH) partitions;
  inscribing an orthoplex into a multi-dimensional space, wherein the orthoplex partitions the multi-dimensional space into symmetrical Voronoi surfaces, wherein each Voronoi surface has as its centroid a vertex of the orthoplex, and wherein each vertex is associated with one of the plurality of LSH partitions;
  receiving an input item;
  generating, using an executable embedding vector generator, an input embedding vector for the input item;
  for a predetermined number of iterations:
    projecting, using an executable LSH mapper, the input item into the orthoplex according to the input embedding vector based on an LSH mapping function corresponding to the current iteration;
    identifying the closest vertex of the orthoplex to the mapped input item; and
    identifying a partition of the plurality of LSH partitions associated with the identified vertex of the orthoplex as a partial LSH signature for the input embedding vector;
  aggregating the partial LSH signatures as the LSH signature for the input embedding vector;
  identifying a first set of items of the corpus of items that are associated with the LSH signature;
  generating, using an executable similarity scorer, a similarity score for each item of the first set items according to their similarity to the input item; and
  providing a subset of the first set items as the most similar items to the input item, wherein the subset of the identified items comprises those identified items of the corpus of items having the highest similarity score to the input item.

10. The non-transitory computer readable medium of claim 9, wherein:
  each item within the corpus of items is further associated with an embedding vector generated for the associated item; and
  the partition associated with each item within the corpus of items is determined according to a projection of the associated embedding vector of the item into the orthoplex.

11. The non-transitory computer readable medium of claim 10, wherein generating a similarity score for each item of the first set items according to their similarity to the input item comprises generating a second similarity score for an identified item according to the similarity between the embedding vectors of the identified item and the input embedding vector.

12. The non-transitory computer readable medium of claim 11, wherein generating the second similarity score for an identified item according to the similarity between the embedding vectors of the identified item and the input embedding vector comprises determining the second similarity score according to a cosine similarity between the embedding vectors of the identified item and the input embedding vector.

13. The non-transitory computer readable medium of claim 12, wherein the method further comprises conducting at least one pseudo-random rotation to orient the input embedding vector associated with the input item with an orientation of the orthoplex.

14. The non-transitory computer readable medium of claim 13, wherein each rotation of the at least one pseudo-random rotation is carried out using a Fast Hadamard Transform.

15. The non-transitory computer readable medium of claim 14, wherein each of the at least one pseudo-random rotation is carried out using the Fast Hadamard Transform on one or more graphic processing units (GPUs).

16. The non-transitory computer readable medium of claim 15, wherein the method further comprises conducting three pseudo-random rotations to orient the input embedding vector associated with the input item with the orientation of the orthoplex.

17. A computer system for hashing an input item to a locality sensitive hashing (LSH) partition containing likely similar items from a corpus of items, the system comprising a processor and a memory, wherein the processor executes instructions stored in the memory as part of or in conjunction with additional components to hash the input item to a locality sensitive hashing (LSH) partition, the additional components comprising:
- a data store storing a corpus of items, wherein each item within the corpus of items is associated with an embedding vector generated for the associated item, and wherein each item within the corpus of items is associated with one partition of a plurality of LSH partitions;
- an executable embedding vector generator that, in execution upon the computer system, generates an embedding vector for the input item;
- an executable LSH mapper that, in execution on the computer system:
  - inscribes the embedding vector for the input item into an orthoplex projected into a multi-dimensional space, and wherein the projected orthoplex subdivides the multi-dimensional space into symmetric Voronoi surfaces, wherein each Voronoi surface has as its centroid a vertex of the orthoplex, and wherein each vertex is associated with one of the plurality of LSH partitions;
  - for each of a predetermined number of iterations:
    - identifies a closest vertex of the orthoplex to the projected input item; and
    - associates the partition associated with the vertex as a partial LSH signature of the input item; and
  - aggregates the partial LSH signatures as an LSH signature for the input item; and
- an executable similarity scorer that, in execution on the computer system:
  - identifies a first set of items of the corpus of items, wherein each item in the first set of items is associated with LSH partition of the input item;
  - generates a similarity score for each item of the first set of items according to the embedding vectors of an item of the first set of items and the input item; and
  - identifies a subset of the first set of items, the subset of the first set of items comprising those items of the first set of items having the highest similarity score.

18. The computer system of claim 17, wherein the similarity scorer further generates for each item of the first set of items according to a cosine similarity function of the embedding vectors of an item of the first set of items and the input item.

* * * * *